May 27, 1947.　　　D. E. WADSWORTH　　　2,421,103
SPRINKLER UNIT
Filed Feb. 2, 1943　　　2 Sheets-Sheet 2
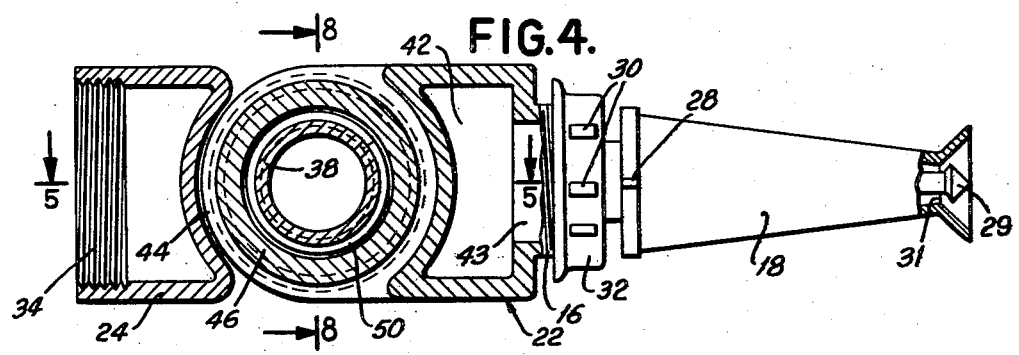
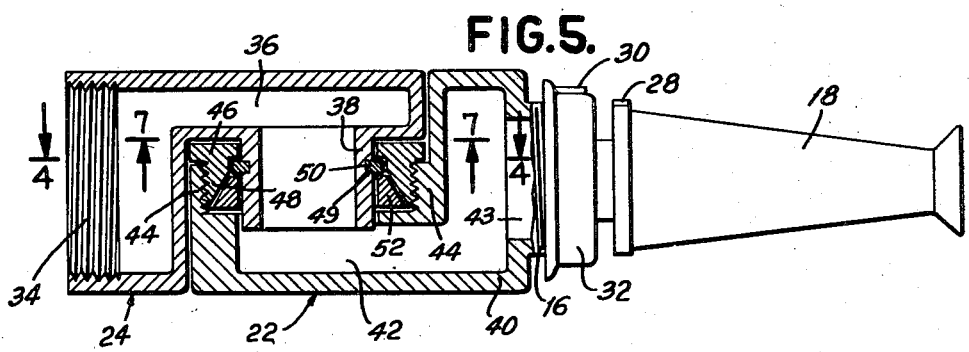
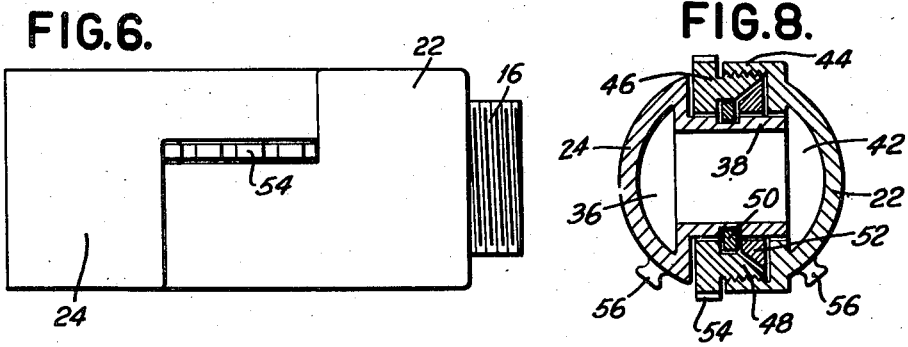
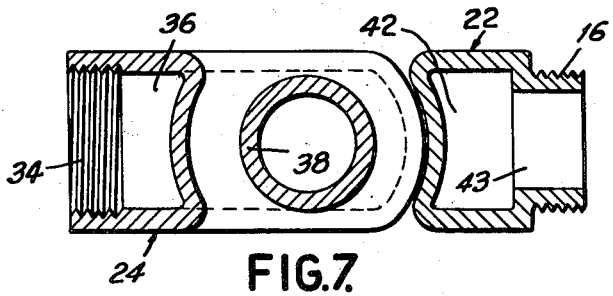
INVENTOR
DONALD E. WADSWORTH
BY
ATTORNEYS Patented May 27, 1947

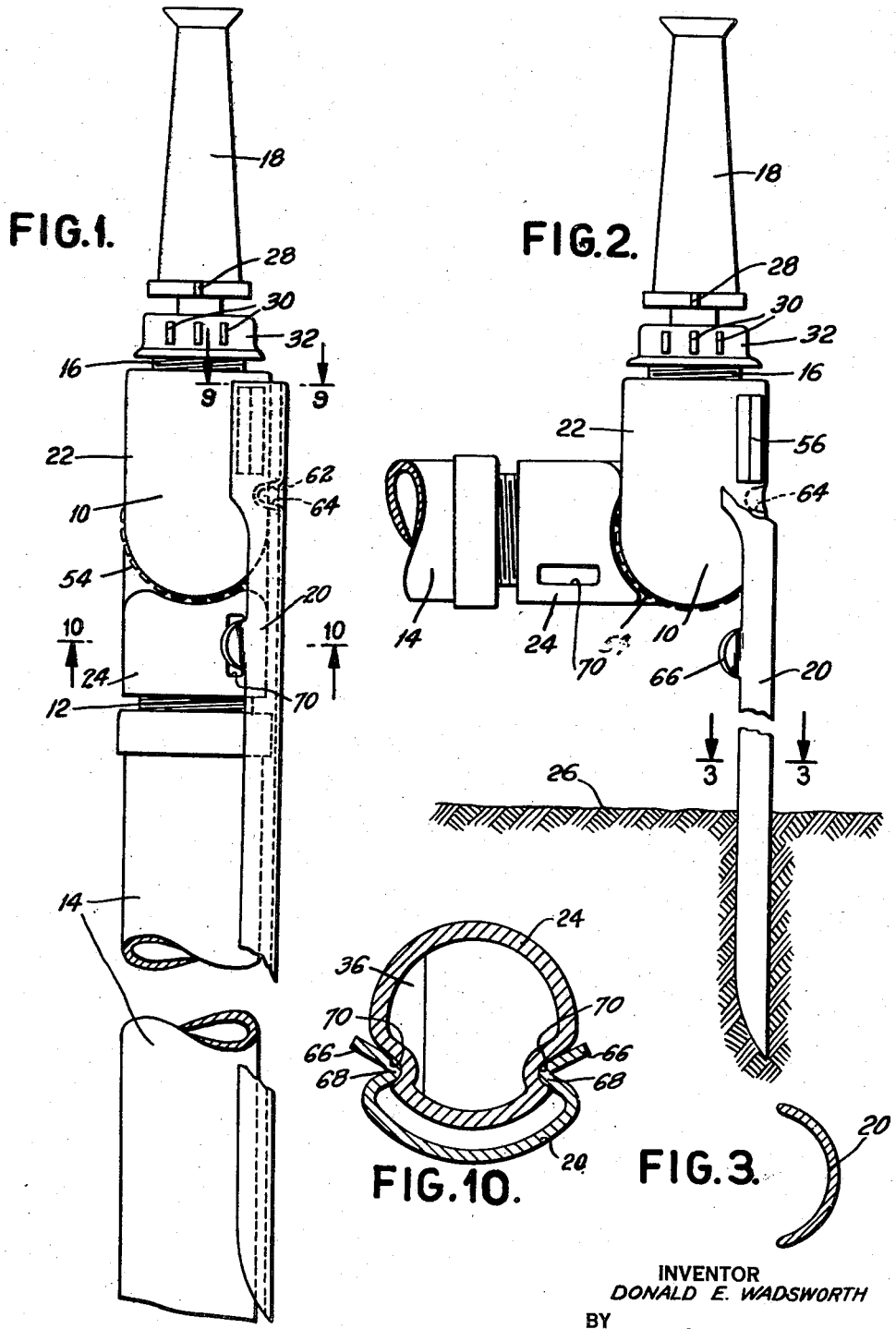

2,421,103

UNITED STATES PATENT OFFICE 2,421,103

SPRINKLER UNIT

Donald E. Wadsworth, Miami, Fla.

Application February 2, 1943, Serial No. 474,467

11 Claims. (Cl. 285—209)

1

This invention relates to improvements in sprinkler units particularly for attachment to the end of a garden hose of the kind that may be held in the hand to direct a stream of water in the direction desired or may be positioned on the ground for distributing the water as a spray or stream over the surrounding area.

It has heretofore been proposed to provide a fitting for attachment to a garden hose having one orifice for use when held in the hand and a second orifice for use when placed in fixed position upon the lawn, both said orifices being controllable so that one is inoperative when the other is rendered operative. It has also been proposed to mount a nozzle for this purpose on a stake or spike which is driven into the ground to maintain the nozzle in fixed position. Stakes for this purpose have also been proposed which are curved in cross-section to fit around the hose when the nozzle is intended to be held in the hand. Where such stakes or spikes have been proposed, they have failed of public acceptance mainly because they have been attachable to a hose having the conventional nozzle, and nothing more, and where a spray is required the axis of which is vertical, difficulty has been experienced in attempting to bend the end of the hose through the required arc of short radius to accomplish the purpose. In practice, such a spike or stake has served merely to replace the human hand but has produced only a spray at an acute angle to the ground. Attempts have therefore been made to solve the difficulty by combining in an integral fixture a nozzle to be held in the hand and a second or spray fixture surmounting the nozzle. When these features are provided with a stake or spike, a particularly bulky and clumsy unit is produced which is inconvenient to hold in the hand, is only partly effective as a spray and has not met with public acceptance.

The present invention seeks a compact sprinkler unit for attachment to the end of a hose which avoids the foregoing defects; can be utilized as a spray or to produce a stream when placed on the ground; can be held in position on the ground by means of a spike or stake pushed into the ground; and which may be conveniently held in the hand for portable hand sprinkling without inconvenience because of the absence of undue weight or bulk.

It is also an object of this invention to provide an adapter unit for use on the nipple end of the hose in combination with an ordinary hose nozzle.

Another object of the invention is a spike or

2 stake carried by the attachment and which will lie along the hose and fit conveniently within the hand holding the sprinkler unit but which, when pushed into the ground, will hold the sprinkler unit in the desired position when used for stationary ground sprinkling.

Yet another object of the invention is a sprinkler unit of the character described which may be set to the desired spray or stream and the stake then pushed into the ground at the desired place, before the operator leaves to go to the valve at a remote place to turn on the water.

A further object of the invention is a sprinkler unit capable of a wide range of nozzle adjustment, including water shut-off.

The invention also seeks a sprinkler unit which is practical from the standpoint of ease and cheapness in manufacture and convenience in use.

These and other objects of the invention and the means for their attainment will be more apparent from the following detailed description taken in connection with the accompanying drawings illustrating one embodiment by which the invention may be realized and in which:

Figure 1 is a view of the sprinkler unit and associated parts in position to be held in the hand;

Figure 2 is a view showing the sprinkler unit in vertical position when fixed on the ground for stationary ground sprinkling;

Figure 3 is a transverse sectional view of the stake of Figures 1 and 2 taken in the plane indicated by the line 3—3 of Figure 2;

Figure 4 is a longitudinal vertical sectional view showing the attachment of this invention, taken on the line 4—4 of Figure 5, looking in the direction of the arrows, the sprinkler unit being in elevation with a part broken away to show the spray stream shut-off instrumentality;

Figure 5 is an axial sectional view taken in the plane indicated by the line 5—5 of Figure 4 looking in the direction of the arrows;

Figure 6 is a view, in plan, showing a modification in which an angularly adjustable coupling member is adapted to be attached to a hose nipple and receive a standard nozzle;

Figure 7 is a longitudinal sectional view taken in the plane indicated by the line 7—7 of Figure 5 looking in the direction of the arrows;

Figure 8 is a transverse sectional view taken in the plane indicated by the line 8—8 of Figure 4 looking in the direction of the arrows;

Figure 9 is an end view of the stake taken in the plane 9—9 of Figure 1, showing the interengaging means mounting the stake on the nozzle; and Figure 10 is a fragmentary sectional view taken in the plane indicated by the line 10—10 of Figure 1, looking in the direction of the arrows and showing means to retain the fitting members in one operative position.

In the drawings, Figs. 1 to 10, the adjustable attachment 10 is shown as threaded on to the threaded nipple 12 of a hose 14. On the opposite end of the attachment 10 is a nipple 16 on which a common type of nozzle 18 is screwed. A spike or stake 20 is mounted on the attachment 10 and is curved, in cross-section, as shown in Figure 3, to lie closely around the hose 14 in the Figure 1 position of the parts.

The attachment 10 is jointed so that the two relatively movable parts 22 and 24 thereof may be positioned at any desired angle, say at right angles to one another as shown in Figure 2, whereby the nozzle end 22 and the stake 20 are, say, vertical while the hose 14 may extend generally parallel to the ground, represented at 26, without bending the hose. The attachment may be so positioned, as in Figure 2, before water is turned on, the type of spray or stream desired being adjusted by rotating the nozzle 18 so that an index 28 thereon may be brought opposite a predetermined graduation 30 (which may be likened to the graduation of a scale) on a fixed part 32 of the nozzle structure which indicates the position of the nozzle 18 to produce the spray or stream sought and which is controlled by the relative position of the needle 29 (Figure 4) with respect to the orifice 31. While the nozzle structure 18 and 32 is shown as removable from the adjustable attachment portion 22, 24, it will be obvious that the nozzle may, for instance, be integral with the adjustable part 22.

Referring now to Figures 4 through 7 for an understanding of one form which the construction of the fitting may take and by which adjustment of the device to project the spray or stream at any angle to the axis of the hose and nipple 12 may be achieved, the fitting comprises two relatively movable sections 22 and 24 of which the section 24 is illustrated as adapted to be screwed on to nipple 12 on the end of a hose 14 by means of the threads 34. The cylindrical portion 24 is reduced to a semi-cylindrical passage portion 36 of ample capacity for the purpose at hand from which extends, at right angles thereto, a cylindrical conduit 38 which also serves as a bearing for the adjustable fitting portion 22. This member 22 is formed with a cylindrical conduit portion 40 communicating with the outlet orifice 43 in the threaded coupling member 16 and is also formed with a semi-cylindrical passage 42 formed with the annular threaded portion 44, the threads of which are adapted to engage a coacting bearing ring 46 having a threaded annular extension 48, triangular in cross-section, and a flange portion 49. In assembly, the bearing ring 46 is placed in position on the annular bearing 38 and held in position by a resilient locking ring 50 seated in a groove 49 in the periphery of the conduit bearing 38. A packing ring 52, triangular in cross-section, is then fitted into the space between the cylindrical bearing conduit 38 and the bearing ring 46.

To removably secure the fitting portion 22 in sealed connection with the part 24 with provision for angular movement, the bearing ring 46 is made capable of manual rotation as by knurling its outer periphery, as shown at 54 in Figures 1, 2 and 6. Thus, upon manual rotation of the knurled bearing ring 46, the threads of the ring are caused to engage the threads on the journal 44 and draw the parts together and hold them in locking engagement so that the nozzle 18 and the fitting 22 on which it is mounted may be turned through any permissive angle within, say, ninety degrees, from the position shown in Figure 1 to the position shown in Figure 2.

The spike or stake 20 is mounted on the adjustable fitting portion 22, as will be understood. While the stake may be secured in any convenient manner, it is preferably mounted so that it cannot be removed. The stake is preferably curvilinear in cross-section as shown in Figure 9 to closely surround the hose when the nozzle is in prolongation thereof and so that it may be conveniently grasped in the hand. As shown for purposes of illustration only, the connection between the stake 20 and fitting 22 comprises lugs 56, Figure 8, and coacting grooves 59 on the stake 20 whereby the stake may be mounted on the fitting portion 22. Without more, the stake is removable from the fitting. If it is desired that the stake be not removable from the fitting, a portion thereof, proximate the upper end, as viewed in Figures 1 and 2, may be forced inwardly after assembly, as shown at 62 to enter a recess 64 in the fitting member 22. This construction permanently prevents relative displacement of the stake in the longitudinal direction thereof so that the stake is not removable.

In either of the foregoing modifications, it is desirable, when the fitting members are in the relative position illustrated in Figure 1, to retain the members in such position. To this end, wing members 66 are formed or otherwise carried by the stake on opposite sides thereof. As shown in Figure 10, the wing members 66 are provided on the inner sides with ribs 68 which are adapted to snap into grooves 70 formed in the fitting member 24 thereby maintaining these members in the positions shown in Figure 1.

Obviously, while the nozzle has been shown as removable from the jointed member, it can be integral therewith.

It will thus be seen that a sprinkler fitting has been provided for the end of the hose which may be disposed at any desired angle with respect to the axis of the hose and which, together with a stake to be inserted in the ground affords a sprinkler directing either a stream or a spray at a selected angle with respect to the horizontal.

Various modifications will occur to those skilled in the art in the composition, configuration and disposition of the various components going to make up the invention as a whole and no limitation is intended by the phraseology of the foregoing description or illustrations in the accompanying drawings except as indicated in the appended claims.

What is claimed is:

1. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises coacting transversely extending bearing means carried within the respective fitting members in communicating connection with the fitting members, respectively, and rotatably mounting the said fitting members together.

2. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: a transversely extending annular bearing within one fitting member and a coacting bearing member coaxial therewith within the other fitting member, said bearing members being in communicating relation with the respective fitting members and thereby serving as a fluid conduit between the fitting members.

3. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: a transversely extending annular bearing member within one fitting member, a coacting transversely extending bearing member within the other member and telescoping on the first-named bearing member, locking means on one bearing member and coacting locking means on the other bearing member to retain the bearing members together, said bearing members serving as a fluid conduit between the fitting members.

4. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: a transversely extending annular bearing member within one fitting member, a coacting coaxial transversely extending bearing member within the other fitting member, said bearing members serving as a fluid conduit between the respective fitting members, locking means on one bearing member and coacting locking means on the other bearing member to retain the bearing members in operative position, and packing to seal the bearing between the respective bearing members.

5. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: a transversely extending annular bearing member carried with the other fitting member and in communicating connection with the other fitting member, one of said bearing members comprising an annular threaded part, a bearing ring on said bearing member formed with a threaded part and a knurled surface coacting with the threaded annular part of the other bearing member, a resilient locking ring retaining the bearing ring on the hollow bearing members, and packing between the respective hollow bearing members.

6. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: transversely extending coacting cylindrical coupling members therewithin in telescoping relation, said coupling members conducting fluid between the fitting members, at least one of said coupling members comprising an annular threaded part, and a bearing ring coacting with said annular threaded part and comprising a knurled surface accessible from without the sprinkler unit to retain the coupling members together.

7. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: a transversely extending cylindrical bearing member communicating with said fitting member, a fitting member for attachment to a nozzle comprising a transversely extending cylindrical bearing member telescoping over the first-named bearing member and communicating with the last-named fitting member, one of said telescoping members being threaded, said telescoping bearing members conducting fluid between the fittings, a bearing ring on a cylindrical bearing formed with a coacting threaded part and a locking ring retaining the bearing ring on the cylindrical conduit portion.

8. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: transversely extending coacting telescoping coupling members integral with the respective fitting members and therewithin and conducting fluid between the fitting members, and means to removably secure the coupling members in communicating relation.

9. In a sprinkler unit having a fitting member for attachment to a hose, a fitting member to receive a spray nozzle and means rotatably mounting the said fitting members together for movement between a position wherein the fitting members are in axial prolongation of one another to positions wherein said fitting members may be angularly displaced relative to one another in a single axial plane, that improvement which comprises: coacting transversely extending telescoping tubular fluid conducting bearing means carried within the respective fitting members and in communicating connection with the fitting members, and locking means between said bearing means to rotatably secure said fitting members together, said bearing means lying within the confines of both of said fitting members, whereby said fitting members when in alignment are free from objectionable projections and form a smooth cylindrical unit which may be grasped conveniently in the hand.

10. In a fluid discharge unit having a cylindrical fitting member provided with an inlet for attachment to a hose, a second cylindrical fitting member provided with an outlet and means to rotatably mounting the said fitting members together for movement between a position wherein the fitting members are aligned in axial prolongation of one another to positions wherein said fitting members are angularly displaced relative to one another in a single axial plane, a stake secured to said second cylindrical fitting member for positioning said unit on the ground with the fitting members angularly disposed relative to one another, said stake having a curvature in cross section of such radius as to closely fit in around and snugly against the hose when the fitting members are in alignment, whereby said unit is adapted to be conveniently grasped in the hand.

11. In a fluid discharge unit having a cylindrical fitting member provided with an inlet for attachment to a hose, a second cylindrical fitting member provided with an outlet and means to rotatably mounting the said fitting members together for movement between a position wherein the fitting members are aligned in axial prolongation of one another to positions wherein said fitting members are angularly displaced relative to one another in a single axial plane, a stake secured to said second cylindrical fitting member for positioning said unit on the ground with the fitting members angularly disposed relative to one another, said stake having a curvature in cross-section of such radius as to closely fit around and snugly against the hose when the fitting members are in alignment, whereby said unit is adapted to be conveniently grasped in the hand, and cooperating latch means carried respectively by the stake and by the first cylindrical fitting member for holding both of said cylindrical members in axial alignment.

DONALD E. WADSWORTH.

REFERENCES CITED

The following references are of record in the file of this patent:

UNITED STATES PATENTS

| Number | Name | Date |
|---|---|---|
| 324,874 | Morton | Aug. 25, 1885 |
| 547,074 | Hendy | Oct. 1, 1895 |
| 1,946,696 | Johnson | Feb. 13, 1934 |
| 525,487 | Crawford | Sept. 4, 1894 |
| 688,407 | Glazier | Dec. 10, 1901 |
| 865,146 | Albee | Sept. 3, 1907 |
| 952,947 | Revaillot | Mar. 22, 1910 |
| 1,946,696 | Johnson | Feb. 13, 1934 |
| 1,249,918 | Dinsmoor | Dec. 11, 1917 |
| 318,790 | Patton | May 26, 1885 |
| 1,143,700 | Hamill | June 22, 1915 |

FOREIGN PATENTS

| Number | Country | Date |
|---|---|---|
| 369,022 | Great Britain | Mar. 17, 1932 |